United States Patent
Vargantwar et al.

(10) Patent No.: US 8,620,363 B1
(45) Date of Patent: Dec. 31, 2013

(54) SYSTEMS AND METHODS FOR COMMUNICATION OF TEXT MESSAGES

(75) Inventors: Sachin R. Vargantwar, Overland Park, KS (US); Manoj J. Shetty, Overland Park, KS (US); Siddharth S. Oroskar, Overland Park, KS (US); Anoop K. Goyal, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 283 days.

(21) Appl. No.: 13/023,333

(22) Filed: Feb. 8, 2011

(51) Int. Cl.
*H04Q 7/20* (2006.01)

(52) U.S. Cl.
USPC ........... 455/466; 455/413; 455/450; 455/453; 455/414.1; 455/458; 704/10; 704/1; 709/227; 709/248; 370/329; 370/342

(58) Field of Classification Search
USPC .............. 455/466, 413, 450, 453, 414.1, 412; 704/10, 1; 707/748; 370/329, 342, 338, 370/328; 709/248, 227
See application file for complete search history.

(56) References Cited

U.S. PATENT DOCUMENTS

| | | | |
|---|---|---|---|
| 5,461,627 A | 10/1995 | Rypinski | |
| 6,535,736 B1 | 3/2003 | Balogh et al. | |
| 7,483,473 B2 | 1/2009 | Hoffmann et al. | |
| 7,636,322 B1 | 12/2009 | Gandhi et al. | |
| 2002/0193127 A1 | 12/2002 | Martschitsch | |

OTHER PUBLICATIONS

TIA/EIA-637-A, TR 45, Short Message Service for Spread Spectrum Systems, Apr. 1999.
Parsa, Kourohs, Parsa Wireless Communications, Overview of CDMA2000 1x RTT channel structure, Dec. 30, 2002.
Langton, Charan, CDMA Tutorial, Intuitive Guide to Principles of Communications, 2002.
Google Wave—What if Email was invented today?, downloaded from the World Wide Web at http://bhopu/com/2009/06/google-wave/ on Aug. 2, 2010.
Concatenated SMS, downloaded from the World Wide Web at http://en.wikipedia.org/wiki/Contatenated_SMS on Nov. 9, 2010.

*Primary Examiner* — Ajit Patel
*Assistant Examiner* — Fred Casca

(57) ABSTRACT

A base station determines occupancy of a channel used for message communication and transmits channel occupancy data to access terminals operable to transmit messages via the channel. An access terminal receives characters for sending a text message via the channel and determines whether the channel occupancy exceeds an occupancy threshold. If the channel occupancy exceeds the threshold, the access terminal transmits characters of the text message to the base station via multiple messages. Each of those messages including a number of characters that does not exceed a maximum number of characters associated with the threshold. If the channel occupancy does not exceed the threshold, the access terminal transmits characters of the text message to the base station via a single message so long as the number of characters does not exceed a maximum number of characters for sending a complete text message to the base station via a single message.

18 Claims, 7 Drawing Sheets

SYSTEMS AND METHODS FOR COMMUNICATION OF TEXT MESSAGES

BACKGROUND

Wireless access terminals, such as cell phones and personal digital assistants (PDAs), may be used to engage in various types of communications, such as voice call communications and non-voice-call communications (e.g., text messaging). Setting up sessions to carry out those communications and/or carrying out those communications may occur via one or more types of channels of an air interface between the access terminals and a radio access network (RAN).

Communications carried over channels from an access terminal to a radio access network are referred to as reverse-link communications. The channels that carry reverse-link communications are referred to as reverse-link channels. Communications carried over channels from a radio access network to an access terminal are referred to as forward-link communications. The channels that carry forward-link communications are referred to as forward-link channels.

For some wireless communication systems, the channels used to set up and/or carry out communications between an access terminal and a radio access network are contention-based random access channels. The likelihood of successfully communicating data over those channels may decrease as the use of such channels increases and/or as the amount of data to be communicated via those same channels increases. The failure to successfully communicate data can result in unsatisfied users/customers. Accordingly, increasing the likelihood of successfully communicating data between access terminals and a radio access network is desirable.

OVERVIEW

The following example embodiments increase the likelihood of successfully communicating data and/or messages between an access terminal and a base station.

In one respect, an example embodiment may take the form of a method comprising: (i) storing, at a data storage device of an access terminal, data indicating a first maximum number of text message characters and data indicating a second maximum number of text message characters, (ii) the access terminal receiving text message characters for a new text message being input at the access terminal, and (iii) the access terminal determining whether an occupancy level of an access channel, selected from among one or more access channels associated with a paging channel being monitored by the access terminal, exceeds a first occupancy threshold. The first maximum number of text message characters is greater than the second maximum number of text message characters.

If the access terminal determines that the occupancy level of the selected access channel exceeds the first occupancy threshold, then the access terminal transmits at least two messages via the selected access channel. Each of the at least two messages includes a number of the received text message characters that does not exceed the second maximum number of text message characters. If the access terminal determines that the occupancy level of the selected access channel does not exceed the first occupancy threshold, then the access terminal transmits, via the selected access channel, a message that includes a number of the received text message characters that does not exceed the first maximum number of text message characters.

In another respect, an example embodiment may take the form of an access terminal comprising: (i) a user interface to receive text message characters for a new text message, (ii) a transceiver to receive signals via a paging channel being monitored by the access terminal, (iii) a data storage device that contains computer-readable program instructions, an occupancy threshold, data indicating a first maximum number of text message characters, and data indicating a second maximum number of text message characters, and (iv) a processor to execute the computer-readable program instructions. The first maximum number of text message characters is greater than the second maximum number of text message characters.

The program instructions comprise program instructions executable by the processor to determine whether an occupancy level of an access channel, selected from one or more access channels associated with the monitored paging channel, exceeds the occupancy threshold. If the processor determines that the occupancy level of the selected access channel exceeds the occupancy threshold, then the processor executes program instructions to cause the transceiver to transmit, via the selected access channel, at least two messages that each include a number of the received text message characters that does not exceed the second maximum number of text message characters. If the processor determines that the occupancy level of the selected access channel does not exceed the occupancy threshold, then the processor executes program instructions to cause the transceiver to transmit, via the selected access channel, a message that includes a number of the received text message characters that does not exceed the first maximum number of text message characters.

In yet another respect, an example embodiment takes the form of a method comprising: (i) a first base station determining access channel occupancy data for each access channel of one or more access channels associated with a paging channel of the first base station, (ii) the first base station transmitting the access channel occupancy data via the paging channel of the base station, wherein the transmitted access channel occupancy data indicates that an occupancy level of a selected access channel associated with the paging channel exceeds an occupancy threshold, (iii) the first base station receiving, via the selected access channel, two or more messages including respective portions of a complete text message, (iv) the first base station providing the respective portions of the complete text message to a server, and (v) the server constructing the complete text message from the respective portions of the complete text message.

In still yet another respect, an example embodiment may take the form of a base station comprising: (i) a radio frequency (RF) transceiver that receives wireless communications via one or more access channels associated with a paging channel of the base station, (ii) a data storage device, and (iii) a processor that is operable to execute computer-readable program instructions that are stored within the data storage device. The computer-readable program instructions comprise program instructions that are executable by the processor to determine access channel occupancy data for each access channel of the one or more access channels associated with the paging channel. The computer-readable program instructions also comprise program instructions for generating a message that includes the determined access channel occupancy data and for causing the RF transceiver to transmit the message via the paging channel.

These as well as other aspects and advantages will become apparent to those of ordinary skill in the art by reading the following detailed description, with reference where appropriate to the accompanying drawings. Further, it should be understood that the embodiments described in this overview and elsewhere are intended to be examples only and do not necessarily limit the scope of the invention.

BRIEF DESCRIPTION OF THE DRAWINGS

Example embodiments of the invention are described herein with reference to the drawings, in which.

DETAILED DESCRIPTION

I. Introduction

Figure 1:
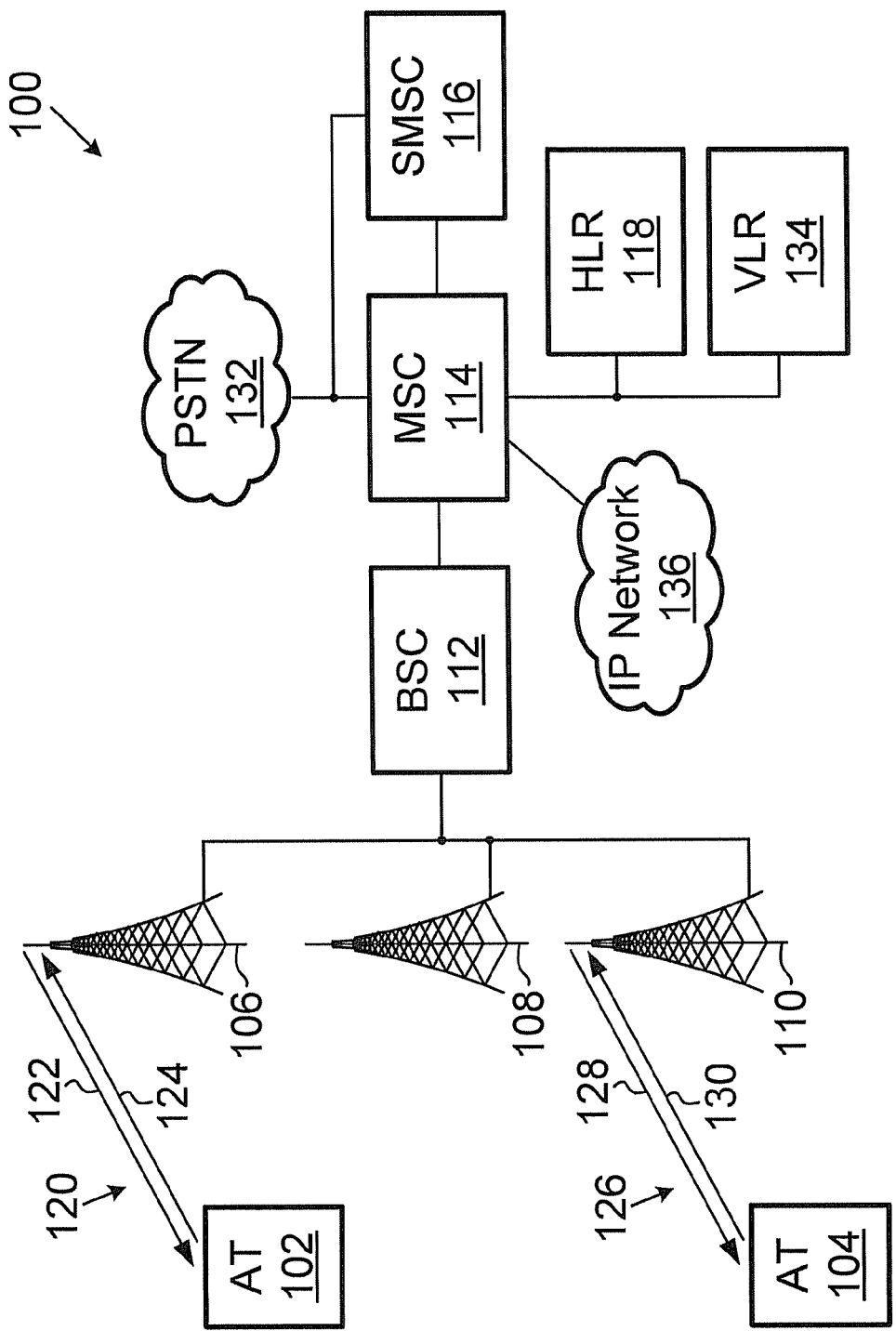
FIG. 1 is a block diagram of a communications network in accordance with an example embodiment.

This description describes example embodiments that increase the likelihood of successfully communicating data and/or messages between an access terminal and a base station. As an example, carrying out the example embodiments may increase the likelihood of successfully communicating a text message from an access terminal to a base station by transmitting individual portions of the text message as the text message is being entered into the access terminal. Each individual portion includes a number of characters of the text message that is less than the total number of characters of the complete text message. The example embodiments set forth example circumstances in which individual portions of a text message should be sent instead of sending a complete text message including all portions of the text message. Those example circumstances include a channel between the access tet inal and a base station having an occupancy level that exceeds a threshold occupancy level.

An access terminal is operable to receive text message characters for a new text message being input at the access terminal. The access terminal can also receive data indicating an occupancy level of an access channel. The access terminal can use that access channel to carry the new text message or individual portions of the text message. The access terminal can compare the occupancy level data to an occupancy threshold so as to determine whether the occupancy level of the access channel exceeds the occupancy threshold.

If the access terminal determines that the occupancy level of the access channel does not exceed the occupancy threshold, then using the access channel, the access terminal transmits a message that includes a number of the received text message characters that does not exceed a first maximum number of text message characters for sending a complete text message (e.g., 160 text message characters).

On the other hand, if the access terminal determines that the occupancy level of the access channel exceeds the occupancy threshold and if the text message includes a number of characters that exceeds a second maximum number of text message characters (e.g., 10 text message characters), then the access terminal transmits at least two messages via the access channel. Each of the at least two messages includes a number of the received text message characters that does not exceed the second maximum number of text message characters.

The first maximum number of text message characters is greater than the second maximum number of text message characters such that the length of each of the at least two messages can be shorter than the length of a message that includes all text message characters of the complete text message. Transmission of shorter length messages can result in fewer messages colliding on the access channel and a higher likelihood of successfully transmitting the messages to a base station.

II. Acronyms and Abbreviations

The following acronyms and abbreviations are used throughout this description.
ACH—access channel
ACHs—access channels
ACHO—access channel occupancy
ACHOT—access channel occupancy threshold
BSC—base station controller
CRPI—computer-readable program instructions
IP—Internet Protocol
MSC—mobile switching center
RAN—radio access network
RF—radio frequency
TMC—text message character
TMCs—text message characters
TMC data—text message character data

III. Example Architecture

FIG. 1 is a block diagram of an example communications network 100 in accordance with example embodiments described herein. It should be understood that the block diagram of FIG. 1 and other diagrams and flow charts accompanying this description are provided merely as examples and are not intended to be limiting. Many of the elements illustrated in the figures and/or described herein are functional elements that may be implemented as discrete or distributed components or in conjunction with other components, and in any suitable combination and location. Those skilled in the art will appreciate that other arrangements and elements (for example, machines, interfaces, functions, orders, and groupings of functions, etc.) can be used instead. Furthermore, various functions described as being performed by one or more elements may be carried out by a processor executing computer-readable program instructions and/or by any combination of hardware, firmware, and software.

As illustrated in FIG. 1, network 100 includes various elements including access terminals 102 and 104, base stations 106, 108, and 110, base station controller (BSC) 112, mobile switching center (MSC) 114, short message service center (SMSC) 116, home location register (HLR) 118, public switched telephone network (PSTN) 132, visitor location register (VLR) 134, and Internet Protocol (IP) network 136.

Base stations 106, 108, and 110 transmit radio frequency (RF) signals to form a respective coverage area (e.g., a cell, a sector, or a cell and a sector). Each of those base stations may be controlled by BSC 112, or by another BSC (not shown). BSC 112 may control base station functions such as handover of access terminals from one coverage area to another coverage area, and transmission power levels of the base stations.

BSC 112 receives communications (e.g., voice communications and text messages) from base stations 106, 108, and 110 and may forward those communications to MSC 114. MSC 114 operates as a switch for connections between, for example, access terminals or between access terminals and a fixed network, such as PSTN 132 or IP network 136. MSC 114 receives communications and forwards those communications to other elements such as BSC 112, SMSC 116, PSTN 132, or IP network 136. As an example, MSC 114 receives text messages from BSC 112 and forwards those messages to SMSC 116. As another example, MSC 114 receives text messages from SMSC 116 and forwards those messages to BSC 112 for transmission, in turn, to a desired endpoint such as access terminal 102.

Access terminals 102 and 104 may be arranged as and/or comprise any of a variety of devices that interface with (e.g., access) a radio access network (RAN) portion of communications network 100. The various devices may include a cellular phone, a personal digital assistant (PDA), or some other type of wireless access device. While access terminal 102 operates in the coverage area formed by base station 106, the RAN portion that access terminal 102 interfaces with may include BSC 112, base station 106, and an air interface 120. While access terminal 104 operates in the coverage area formed by base station 110, the RAN portion that access terminal 104 interfaces with may include BSC 112, base station 110, and an air interface 126.

Air interface 120 includes a forward-link 122 and a reverse-link 124. Forward-link 122 and reverse-link 124 may be a pair of frequencies known as carriers. Base station 106 transmits to access terminal 102 on one of the frequencies, and access terminal 102 transmits to base station 106 on the other. Similarly, air interface 126 includes a forward-link 128 and a reverse-link 130. Forward-link 128 and reverse-link 130 may be a pair of frequencies (i.e., carriers). Base station 110 transmits to access terminal 104 on one of the frequencies, and access terminal 104 transmits to base station 110 on the other.

Forward-links 122 and 128 may each include multiple forward-link channels including, but not limited to, one or more pilot channels, one or more synch channels, one or more paging channels, and one or more forward traffic channels. Each paging channel is used by a base station to transmit page messages, text messages, and other types of messages. As an example, forward-link 122 may have 7 paging channels each of which is associated with a respective Walsh code between and including the Walsh codes 1 and 7. Each paging channel of forward-link 122 may, for example, be associated with up to 32 reverse-link access channels.

Reverse-links 124 and 130 may each include multiple reverse-link channels including, but not limited to, one or more access channels and one or more reverse traffic channels. An access channel is used by access terminal when no traffic channel is assigned to the access terminal. An access channel can be used for registering an access terminal, originating a call, responding to page messages, transmitting text messages, and for other reasons.

HLR 118 is a location register containing data that indicates locations of access terminals that are assigned to HLR 118. HLR 118 may contain data that indicates whether each of its assigned access terminals is active (e.g., registered with a base station) or inactive (e.g., not registered with a base station), and routing information for routing a communication (e.g., a voice call or a text message) to an access terminal assigned to HLR 118. As an example, access terminal 102 may be assigned to HLR 118 and access terminal 104 may be assigned to HLR 118 or to a different HLR (not shown).

VLR 134 may comprise one comprise one or more registers that contain data regarding the access terminals that are operating in the service area of MSC 114, but which are not in the home service areas associated with those access terminals. MSC 114 and BSC 112 may use the data contained in VLR 134 to direct a communication (e.g., a voice call or a text message) to one or more base stations servicing the access terminal to which that communication is addressed.

Short message service center (SMSC) 116 is operable to store incoming text messages and to route and/or forward the stored text messages on their way to desired endpoints, such as access terminals 102 and 104 or a node on IP network 136. SMSC 116 may include a processor and a data storage device that stores computer-readable program instructions and incoming text messages until those messages have been delivered to the desired endpoints. SMSC 116 may operate as a server of stored text messages. The text messages stored at SMSC 116 may be referred to as short message service (SMS) messages or some other type of text message.

SMSC 116 may query HLR 118 and/or VLR 132 to determine that the desired endpoint (e.g., access terminal 102) is active and within range of a base station and then forward a text message for the desired endpoint to the base station for transmission of the text message to the desired endpoint. SMSC 116 may include and/or interface to one or more gateways (not shown) between other elements of network 100 (e.g., MSC 114 and PSTN 132).

A person having ordinary skill in the art will understand that communications network 100 may include other elements, but those elements are not shown in FIG. 1 so as to not distract from the elements that are shown in in FIG. 1.

Figure 2:
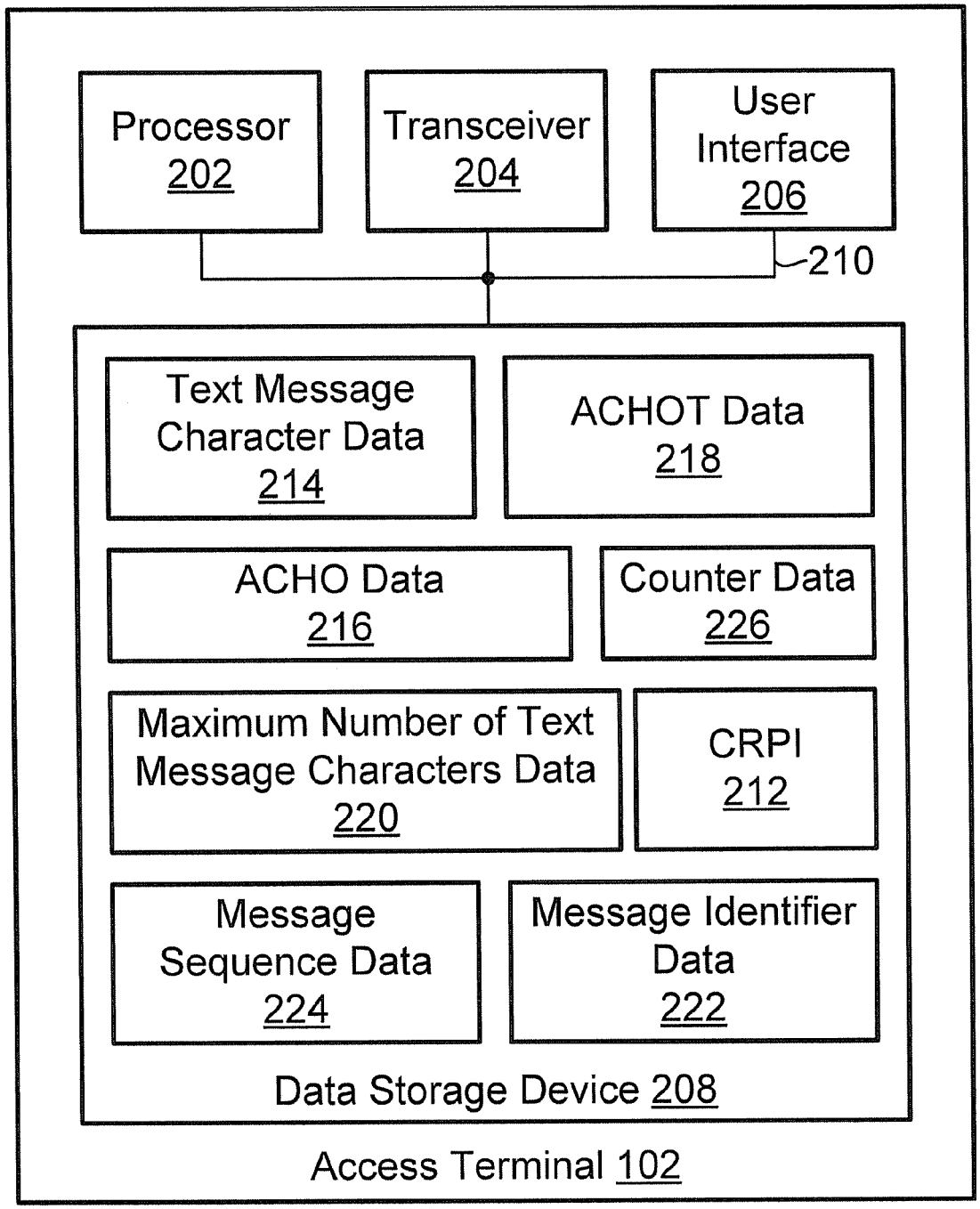
FIG. 2 is a block diagram of an access terminal in accordance with an example embodiment.

Next, FIG. 2 is a block diagram of access terminal 102. Access terminal 104, as well as one or more other access terminals (not shown), may be configured in an arrangement similar to access terminal 102. As illustrated in FIG. 2, access terminal 102 includes a processor 202, a transceiver 204, a user interface 206, and a data storage device 208, all of which may be linked together via a system bus, network, or other connection mechanism 210.

Processor 202 may comprise one or more general purpose processors (for example, INTEL single core microprocessors or INTEL multicore microprocessors) and/or one or more special purpose processors (for example, digital signal processors). Processor 202 is operable to execute computer-readable program instructions, such as computer-readable program instructions (CRPI) 212.

Transceiver 204 (e.g., an RF transceiver) may include a transmitter to transmit communications, a receiver to receive communications, and one or more antennas. The transmitter may be separate from the receiver (e.g., a transceiver and receiver on separate integrated circuit chips) or co-located with the receiver (e.g., a transceiver and receiver on a single integrated circuit chip).

Transceiver 204 is operable to transmit radio frequency (RF) communications to a base station via a reverse-link (e.g., reverse-link 124) and to receive RF communications transmitted from a base station via a forward-link (e.g., forward-link 122). Processor 202 may provide transceiver 204 with the communication signals (e.g., a message including a complete text message or a message including a portion of a complete text message) to be transmitted as RF communications. Transceiver 204 may provide processor 202 with communication signals recovered from the RF communications it receives from a base station.

Figure 3:
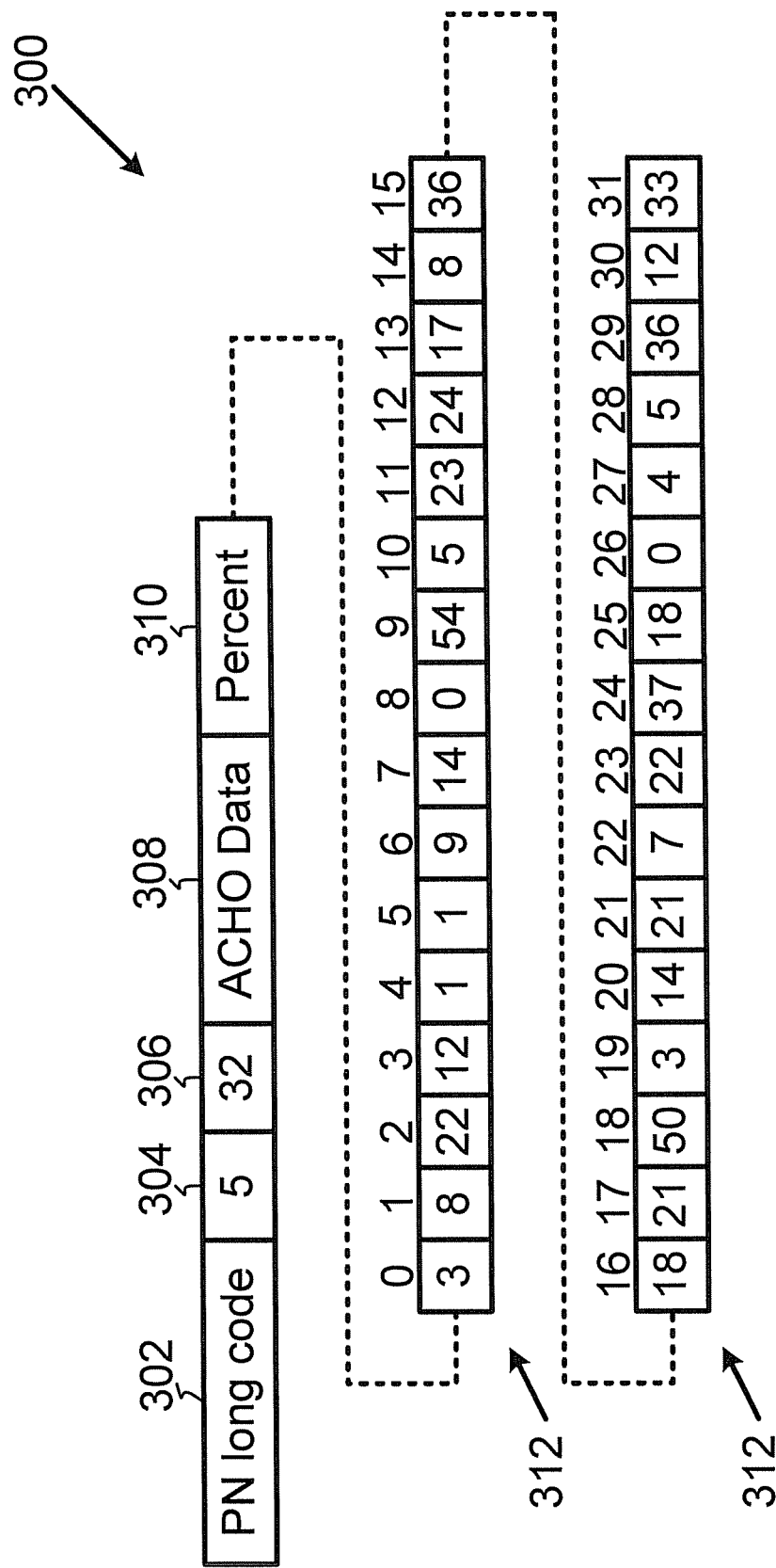
FIG. 3 is a diagram illustrating an example message in accordance with an example embodiment.

Turning to FIG. 3, that figure illustrates an example message 300 that transceiver 204 can receive from base station 106. Base station 106 may transmit message 300 via a paging channel of forward-link 122. Message 300 includes occupancy data 312 determined by base station 106 for access channels associated with a paging channel being monitored by access terminal 102. The paging channel that carries message 300 and the paging channel monitored by access terminal 102 may be the same paging channel.

Message 300 also includes a base station identifier 302 (e.g., a pseudorandom noise (PN) long code associated with base station 106), a paging channel identifier 304 that identifies a particular paging channel broadcast by base station 106 (e.g., a paging channel associated with a Walsh code 5), a quantity identifier 306 that identifies how many access channels are associated with the paging channel identified by paging channel identifier 304, a data type 308 that indicates a type of data included within message 300 (e.g., access channel occupancy data), and a units type 310 that identifies the units associated with occupancy data 312. The numbers 0-31 above the occupancy data 312 refer to a particular access channel associated with the paging channel identified by paging channel identifier 304. A person having ordinary skill in the art will understand that other examples of messages that include access channel occupancy data determined by a base station are also possible.

Figure 4:
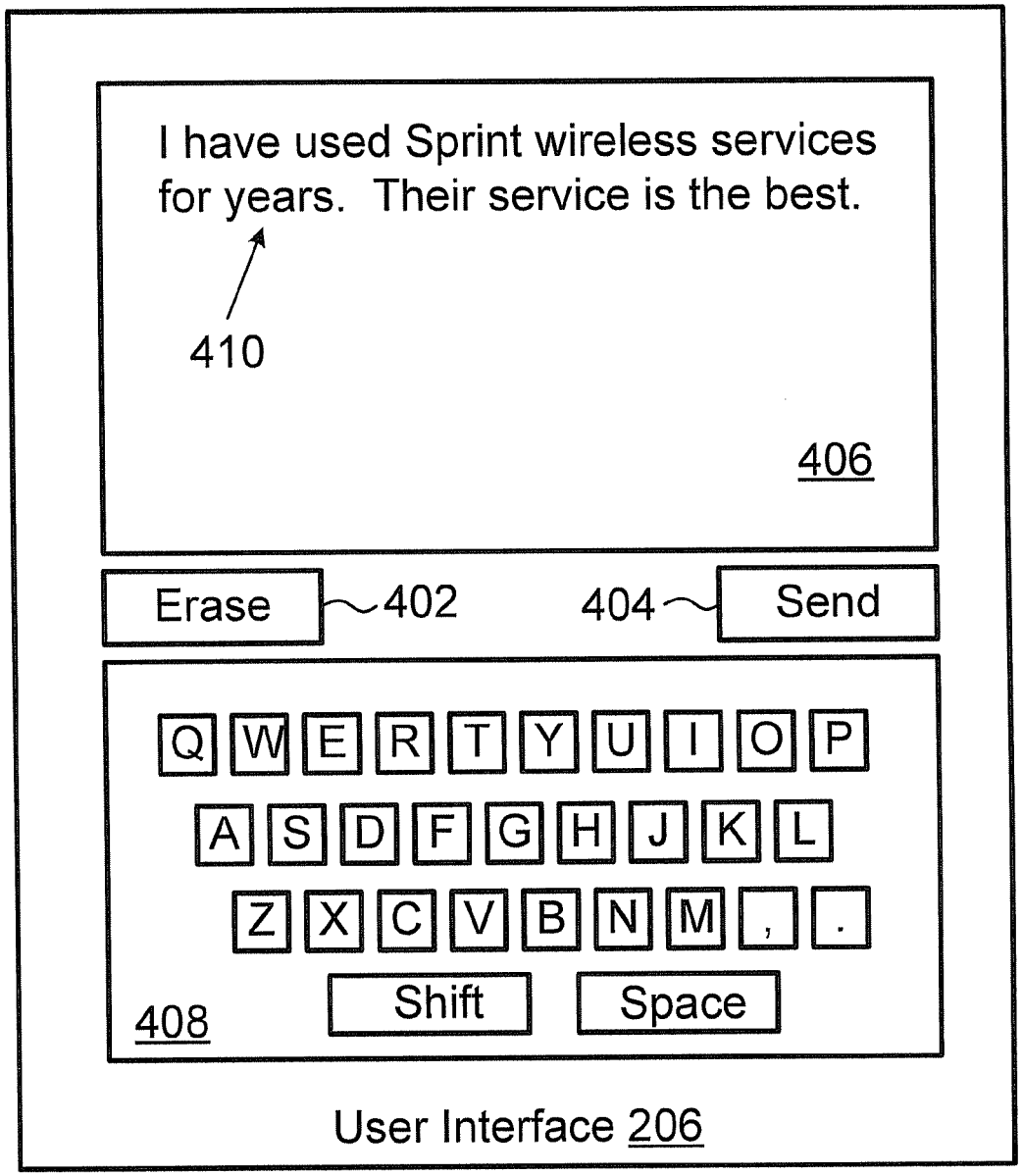
FIG. 4 is a diagram illustrating details of an example user interface of an access terminal.

Turning to FIG. 4, that figure illustrates example elements of user interface 206. The elements illustrated in FIG. 4 can be used to input data (e.g., commands and text message characters) into access terminal 102 or to present data to a user of access terminal 102.

As shown in FIG. 4, user interface 206 may include a keyboard 408 for entering characters, such as characters of a text message or characters of a uniform resource locator (URL) associated with a node on IP network 136. Keyboard 408 may comprise a QWERTY keyboard, an AZERTY keyboard, or some other type of keyboard. QWERTY and AZERTY keyboards refer to arrangements of keys on the keyboard. Entering each character may include pressing one or more keys on keyboard 408, and pressing those key(s) may cause an electrical signal to be provided to processor 202. Processor 202 can execute computer-readable program instructions (CRPI) 212 to interpret the received electrical signal as a particular text message character (TMC) and cause that TMC to be stored within TMC data 214.

As another example, user interface 206 may include an ERASE key 402 that is operable to input a command, such as a command to erase a text message received from a base station, a command to erase a text message transmitted to a base station via transceiver 204, and a command to erase a TMC of a text message being entered via user interface 206.

As yet another example, user interface 206 may include a SEND key 404 that is operable to input a command, such as a command that causes processor 202 to execute program instructions that cause transceiver 204 to transmit a text message entered via keyboard 408. Processor 202 may execute CRPI 212 that interpret an electrical signal generated in response to pressing SEND key 404 as a signal that indicates an end-of-message, such as the end of a text message, has been entered.

As still yet another example, user interface 206 may include a loudspeaker and associated electrical circuitry for audibly presenting data to a user, and a display 406 for visually presenting data to a user. Display 406 may comprise a liquid crystal display (LCD), a light emitting diode (LED) display, or some other type of display. Data presented via display 406 may include, for example, text messages input via keyboard 408 or received from a base station. FIG. 4 illustrates display 406 displaying a text message 410.

Returning to FIG. 2, data storage device 208 may comprise a computer-readable storage medium readable by processor 202. The computer-readable storage medium may comprise volatile and/or non-volatile storage components, such as optical, magnetic, organic or other memory or disc storage, which can be integrated in whole or in part with processor 202. As illustrated in FIG. 2, data storage device 208 contains CRPI 212, TMC data 214, access channel occupancy threshold (ACHOT) data 216, access channel occupancy (ACHO) data 218, maximum number of text message characters data 220, message identifier data 222, message sequence data 224, and counter data 226. Examples of CRPI 212 and that data are described below.

Text message character (TMC) data 214 comprises the TMCs entered via user interface 206. As an example, TMC data 214 may comprise the TMCs of text message 410. TMC data 214 may comprise TMCs for one or more text messages, such as a text message being entered via keyboard 408 and one or more text messages that have already been transmitted to SMSC 116. Alternatively, TMC data 214 may comprise TMCs for a text message being entered but not for a text message that has already been transmitted to SMSC 116. TMCs of text messages that access terminal 102 receives from a base station may be stored as TMC data or at another portion of data storage device 208.

Access channel occupancy (ACHO) data 216 may comprise data that indicates an occupancy level of one or more access channels associated with a paging channel being monitored by access terminal 102. Access terminal 102 may receive ACHO data via message 300 or via some other message transmitted by a base station. Table 1 illustrates an example of data that may be stored as ACHO data 216. In that regard, ACHO data 216 includes ACHO data for the access channels that are associated with paging channel number 5 (e.g., access channels numbered 0 to 31). Paging channel number 5 is a paging channel of the base station to which access terminal 102 is registered. Access terminal 102 and/or processor 202 can determine ACHO data for any access channel associated with paging channel number 5 by referring to ACHO data 216.

TABLE 1

| Paging Channel Identifier | Access Channel (ACH) Identifier | Access Channel Occupancy (ACHO) Data |
|---|---|---|
| 5 | 0 | 3% |
| 5 | 1 | 8% |
| 5 | 2 | 22% |
| 5 | 3 | 12% |
| 5 | 4 | 1% |
| 5 | 5 | 1% |
| 5 | 6 | 9% |
| 5 | 7 | 14% |
| 5 | 8 | 0% |
| 5 | 9 | 54% |
| 5 | 10 | 5% |
| 5 | 11 | 23% |
| 5 | 12 | 24% |
| 5 | 13 | 17% |
| 5 | 14 | 8% |
| 5 | 15 | 36% |
| 5 | 16 | 18% |
| 5 | 17 | 21% |
| 5 | 18 | 50% |
| 5 | 19 | 3% |
| 5 | 20 | 14% |
| 5 | 21 | 21% |
| 5 | 22 | 7% |
| 5 | 23 | 22% |
| 5 | 24 | 37% |
| 5 | 25 | 18% |
| 5 | 26 | 0% |
| 5 | 27 | 4% |

TABLE 1-continued

| Paging Channel Identifier | Access Channel (ACH) Identifier | Access Channel Occupancy (ACHO) Data |
|---|---|---|
| 5 | 28 | 5% |
| 5 | 29 | 36% |
| 5 | 30 | 12% |
| 5 | 31 | 33% |

Access channel occupancy threshold (ACHOT) data 218 may comprise one or more thresholds pertaining to an occupancy level of an ACH or to multiple ACHs. Preferably, the units of ACHO data 216 and ACHOT data 218 are the same so that comparisons of those data may occur without converting one or both types of data 216 and 218. ACHOT data 218 may be fixed for the service life of an access terminal. Alternatively, ACHOT data 218 may be modified one or more times during the service life of the access terminal. For example, while ACHOT data 218 includes ACHOT data from base station 106, access terminal 102 may receive ACHOT data from base station 108 when access terminal 102 performs an idle mode handoff from base station 106 to base station 108, and then access terminal 102 may store the ACHOT data received from base station 108 as ACHOT data 218. Access terminal 102 would also receive ACHO data for base station 108 while or after handing over to base station 108.

Maximum number of TMCs data 220 may comprise one or more numbers that indicate a maximum number of TMCs that may be included in a text message to be transmitted by transceiver 204. In one respect, maximum number of TMC data 220 may comprise a single maximum number that is associated with an access channel occupancy threshold (ACHOT). If processor 202 determines that an access channel occupancy is greater than the ACHOT, then the single maximum number of TMCs is used to limit how many TMCs may be included within a text message sent by transceiver 204. On the other hand, if processor 202 determines that the access channel occupancy is less than the ACHOT, then a maximum number of TMCs for sending a complete text message may be used to limit how many TMCs may be included within a text message sent by transceiver 204. That maximum number of TMCs may be stored with maximum number of TMCs data 222 or at another part of data storage device 208.

In another respect, maximum number of TMC data 220 may comprise multiple maximum numbers such as those shown in the left-most column of Table 2. Each of those numbers is associated with a respective ACHOT of ACHOT data 218. As shown in Table 2, an ACHOT of 30% is associated with a maximum number of TMCs equal to 10, an ACHOT of 20% is associated with a maximum number of TMCs equal to 20, and an ACHOT of 10% is associated with a maximum number of TMCs equal to 30.

In accordance with the example data shown in Table 2, if the occupancy of a given ACH exceeds 30%, then the maximum number of TMCs to be sent in a text message over the given ACH is 10 TMCs. If the occupancy of the given ACH exceeds 20% but not 30%, then the maximum number of TMCs to be sent in a text message over the given ACH is 20 TMCs. If the occupancy of the given ACH exceeds 10% but not 20%, the maximum number of TMCs to be sent in a text message over the given ACH is 30 TMCs. Alternatively, if the occupancy of the given ACH does not exceed the lowest ACHOT (e.g., 10%), then the maximum number of TMCs to be sent in a text message over the given ACH can be equal to the maximum number of TMCs for sending a complete text message (e.g., 160 TMCs).

TABLE 2

| Maximum Number of Test Message Character Data | ACHOT Data |
|---|---|
| 10 | 30% |
| 20 | 20% |
| 30 | 10% |

Message identifier data 222 includes data that may be included in each individual message transmitted by transceiver 204 that include a portion of a complete text message entered at access terminal 102. Message identifier data 222 uniquely identifies the complete text message and/or a message including a portion of the complete text message. As an example, message identifier data 222 may include a randomly assigned number that has not been previously used as message identifier data 222 or at least not used for some given period of time (e.g., 1 week, 1 month, or 1 year) leading up to the time that it is to be used again. As another example, message identifier data 222 may include a non-random identifier such as the coordinated universal time (UTC) at which the first TMC of the complete text message was entered at access terminal 102.

Table 3 illustrates an example message identifier (i.e., 2) that can be used to identify that each message that includes a portion of a complete text message (e.g., text message 410) includes a portion of that text message. Message identifier data 222 may be changed after each message including a portion of the complete text message has been received by SMSC 116. Additionally or alternatively, message identifier data 222 may be changed when user interface 206 is being used to enter another text message.

Message sequence data 224 includes data that can be transmitted with each message that includes a portion of a complete text message entered at access terminal 102. Table 3 illustrates example message sequence identifiers that can be stored as message sequence data 224 as text message 410 is being input at access terminal 102. The first message including a first set of TMCs entered for text message 410 may be include the message sequence identifier 1 to indicate that the TMCs of that message are the first TMCs of text message 410. As the next group (e.g., a second group) of TMCs is being entered for text message 410, message sequence data 224 may increment by 1 (e.g., from 1 to 2). The next message including a next set of TMCs entered for text message 410 may be include the next incremented message sequence identifier (e.g., 2) to indicate that the TMCs of that message are the next TMCs of text message 410. After the last group (e.g., a sixth group) of TMCs of the text message 410 are entered, message sequence data 224 may be reset to 1 so as to be ready for identifying the first message including a first set of TMCs entered for another text message.

Counter data 226 may comprise data for one or more counters. Table 3 illustrates the value of 2 of those counters (e.g., Counter 1 and Counter 2) after each TMC of message 410 is entered.

In Table 3, the column identified as "Counter 1" represents the number of TMCs that have been entered since the most-recent transmission of a TMC of text message 410 or since the first TMC of text message 410 has been entered. The value of Counter 1 changes each time another TMC has been entered. Processor 202 may execute CRPI 212 to compare the value of counter 1 to a maximum number of TMCs so as to determine that a message including a portion of the complete text message should be sent to SMSC 116.

In Table 3, the column identified as "Counter 2" represents a value of the total number of TMCs that have been entered for text message 410. The value of Counter 2 may be used to determine if the maximum number of TMCs for a complete text message has been entered.

The value of Counter 1 may be set to a value of 0 after any of the TMCs of text message 410 are transmitted. The value of Counter 2 may be set to a value of 0 prior to user interface 206 being used to enter a new text message.

In Table 3, the column identified as "TMC of text message" indicates the TMC of text message 410 that has been entered. The symbol "Ø" represents a space that was entered between other TMCs.

In Table 3, the column identified as "Max. No. of TMCs" represents the value of maximum text message character data 220 that is being used to determine whether the TMCs of a text message should be transmitted prior to pressing of SEND key 404. In accordance with an example embodiment, the value of the maximum number of TMCs may change during entry of TMCs for a complete text message. Table 3 illustrates such a change occurring after the $30^{th}$ TMC of the text message has been entered. Such change may occur in response to access terminal 102 receiving ACH occupancy data 218 that corresponds to a maximum number of TMCs that differs from the maximum number of TMCs currently being used.

In accordance with another example embodiment, the value of the maximum number of TMCs may stay constant during entry of TMCs for a complete text message. Thus, even if access terminal 102 receives ACH occupancy data 218 that corresponds to a different maximum number of TMCs than the current maximum number of TMCs, access terminal 102 continues to use the current maximum number of TMCs until the complete text message has been sent to SMSC 116.

In Table 3, the column identified as "SEND key pressed after TMC entered" indicates whether SEND key 404 was pressed after the TMC in the left-most column of that row was entered and prior to entry of the next TMC. For text message 410, SEND key 404 is pressed after the $74^{th}$ TMC was entered.

In Table 3, the column identified as "Transmit TMCs" indicates whether the TMC data 214 was transmitted. An end-of-message indicator may be sent within a message including TMCs 71 to 74 so that base station 106 and/or SMSC 116 can determine that the user has entered the complete text message. In that regard, the end-of-message indicator is included with a final message including TMCs of the complete text message.

TABLE 3

| TMC of text message | Counter 1 | Counter 2 | Max. No. of TMCs | SEND key pressed after TMC entered | Transmit TMCs | Msg. ID | Message Sequence ID |
|---|---|---|---|---|---|---|---|
| I | 1 | 1 | 10 | No | No | 2 | 1 |
| Ø | 2 | 2 | 10 | No | No | 2 | 1 |
| h | 3 | 3 | 10 | No | No | 2 | 1 |
| a | 4 | 4 | 10 | No | No | 2 | 1 |
| v | 5 | 5 | 10 | No | No | 2 | 1 |
| e | 6 | 6 | 10 | No | No | 2 | 1 |
| Ø | 7 | 7 | 10 | No | No | 2 | 1 |
| u | 8 | 8 | 10 | No | No | 2 | 1 |
| s | 9 | 9 | 10 | No | No | 2 | 1 |
| e | 10 | 10 | 10 | No | Yes | 2 | 1 |
| d | 1 | 11 | 10 | No | No | 2 | 2 |
| Ø | 2 | 12 | 10 | No | No | 2 | 2 |
| S | 3 | 13 | 10 | No | No | 2 | 2 |
| p | 4 | 14 | 10 | No | No | 2 | 2 |
| r | 5 | 15 | 10 | No | No | 2 | 2 |
| i | 6 | 16 | 10 | No | No | 2 | 2 |
| n | 7 | 17 | 10 | No | No | 2 | 2 |
| t | 8 | 18 | 10 | No | No | 2 | 2 |
| Ø | 9 | 19 | 10 | No | No | 2 | 2 |
| w | 10 | 20 | 10 | No | Yes | 2 | 2 |
| i | 1 | 21 | 10 | No | No | 2 | 3 |
| r | 2 | 22 | 10 | No | No | 2 | 3 |
| e | 3 | 23 | 10 | No | No | 2 | 3 |
| l | 4 | 24 | 10 | No | No | 2 | 3 |
| e | 5 | 25 | 10 | No | No | 2 | 3 |
| s | 6 | 26 | 10 | No | No | 2 | 3 |
| s | 7 | 27 | 10 | No | No | 2 | 3 |
| Ø | 8 | 28 | 10 | No | No | 2 | 3 |
| s | 9 | 29 | 10 | No | No | 2 | 3 |
| e | 10 | 30 | 10 | No | Yes | 2 | 3 |
| r | 1 | 31 | 20 | No | No | 2 | 4 |
| v | 2 | 32 | 20 | No | No | 2 | 4 |
| i | 3 | 33 | 20 | No | No | 2 | 4 |
| c | 4 | 34 | 20 | No | No | 2 | 4 |
| e | 5 | 35 | 20 | No | No | 2 | 4 |
| s | 6 | 36 | 20 | No | No | 2 | 4 |
| Ø | 7 | 37 | 20 | No | No | 2 | 4 |
| f | 8 | 38 | 20 | No | No | 2 | 4 |
| o | 9 | 39 | 20 | No | No | 2 | 4 |
| r | 10 | 40 | 20 | No | No | 2 | 4 |
| Ø | 11 | 41 | 20 | No | No | 2 | 4 |
| y | 12 | 42 | 20 | No | No | 2 | 4 |
| e | 13 | 43 | 20 | No | No | 2 | 4 |
| a | 14 | 44 | 20 | No | No | 2 | 4 |
| r | 15 | 45 | 20 | No | No | 2 | 4 |

TABLE 3-continued

| TMC of text message | Counter 1 | Counter 2 | Max. No. of TMCs | SEND key pressed after TMC entered | Transmit TMCs | Msg. ID | Message Sequence ID |
|---|---|---|---|---|---|---|---|
| s | 16 | 46 | 20 | No | No | 2 | 4 |
| . | 17 | 47 | 20 | No | No | 2 | 4 |
| Ø | 18 | 48 | 20 | No | No | 2 | 4 |
| T | 19 | 49 | 20 | No | No | 2 | 4 |
| h | 20 | 50 | 20 | No | Yes | 2 | 4 |
| e | 1 | 51 | 20 | No | No | 2 | 5 |
| i | 2 | 52 | 20 | No | No | 2 | 5 |
| r | 3 | 53 | 20 | No | No | 2 | 5 |
| Ø | 4 | 54 | 20 | No | No | 2 | 5 |
| s | 5 | 55 | 20 | No | No | 2 | 5 |
| e | 6 | 56 | 20 | No | No | 2 | 5 |
| r | 7 | 57 | 20 | No | No | 2 | 5 |
| v | 8 | 58 | 20 | No | No | 2 | 5 |
| i | 9 | 59 | 20 | No | No | 2 | 5 |
| c | 10 | 60 | 20 | No | No | 2 | 5 |
| e | 11 | 61 | 20 | No | No | 2 | 5 |
| Ø | 12 | 62 | 20 | No | No | 2 | 5 |
| i | 13 | 63 | 20 | No | No | 2 | 5 |
| s | 14 | 64 | 20 | No | No | 2 | 5 |
| Ø | 15 | 65 | 20 | No | No | 2 | 5 |
| t | 16 | 66 | 20 | No | No | 2 | 5 |
| h | 17 | 67 | 20 | No | No | 2 | 5 |
| e | 18 | 68 | 20 | No | No | 2 | 5 |
| Ø | 19 | 69 | 20 | No | No | 2 | 5 |
| b | 20 | 70 | 20 | No | Yes | 2 | 5 |
| e | 1 | 71 | 20 | No | No | 2 | 6 |
| s | 2 | 72 | 20 | No | No | 2 | 6 |
| t | 3 | 73 | 20 | No | No | 2 | 6 |
| . | 4 | 74 | 20 | Yes | Yes | 2 | 6 |

CRPI 212 may comprise a variety of computer-readable program instructions. A person having ordinary skill in the art will understand that this description's reference to executing CRPI 212 may refer to executing all CRPI 212 or executing only a portion of CRPR 212. A portion of CRPI 212 that is executed is the portion implemented to carry out some particular function(s). The CRPI 212 described below are provided merely as examples and are not intended to be limiting since other CRPI may be implemented to carry out the described functions.

CRPI 212 may comprise program instructions executable by processor 202 to select which paging channel of base station 106 to monitor, and to select an access channel associated with the monitored paging channel. As an example, those program instructions may include a hashing algorithm, based on a phone number associated with access terminal 102, that is used to select the paging channel that will be monitored by access terminal 102, and those program instructions may randomly select one of the access channels associated with the selected paging channel.

CRPI 212 may comprise program instructions executable by processor 202 to retrieve, from ACHO data 216, occupancy data for the selected access channel, retrieve at least one occupancy threshold from ACHOT data 218, and compare the retrieved occupancy data to the retrieved occupancy threshold(s) so as to determine whether the occupancy level of the selected access channel exceeds any of the retrieved occupancy threshold(s).

CRPI 212 may comprise program instructions executable by processor 202 to determine a maximum number of TMCs that may be included in a complete text message or in messages including a portion of the complete text message to be transmitted via the selected access channel. Those program instructions may associate individual maximum numbers of TMCs from maximum number of TMCs data 220 to individual occupancy thresholds of ACHOT data 218, as shown in Table 2. Those program instructions may be executable to carry out the functions to determine which maximum number of TMCs to use based on the occupancy of the selected access channel.

Figure 5:
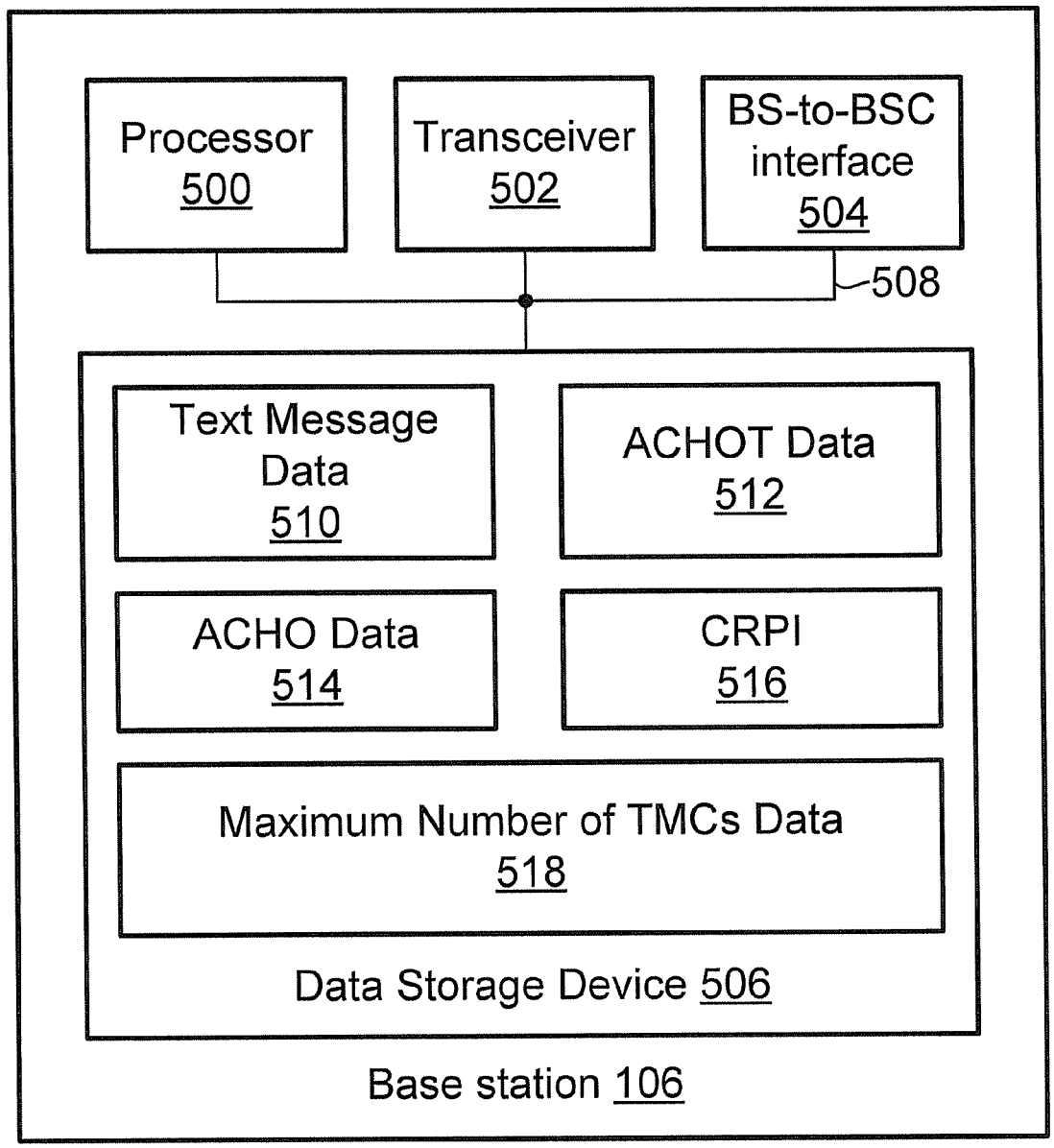
FIG. 5 is a block diagram of a base station in accordance with an example embodiment.

Next, FIG. 5 is a block diagram of an example arrangement of base station 106. One or more other base stations (e.g., base stations 108 and 110) may be configured in an arrangement similar to base station 106. As illustrated in FIG. 5, base station 106 includes a processor 500, a transceiver 502, a base-station-to-base-station-controller (BS-to-BSC) interface 504, and a data storage device 506, all of which may be linked together via a system bus, network, or other connection mechanism 508.

Processor 500 may comprise one or more general purpose processors (for example, INTEL single core microprocessors or INTEL multicore microprocessors) and/or one or more special purpose processors (for example, digital signal processors). Processor 500 is operable to execute computer-readable program instructions, such as computer-readable program instructions (CRPI) 516.

Transceiver 502 (e.g., an RF transceiver) may include a transmitter to transmit communications, a receiver to receive communications, and one or more antennas. The transmitter may be separate from the receiver (e.g., a transceiver and receiver on separate integrated circuit chips) or co-located with the receiver (e.g., a transceiver and receiver on a single integrated circuit chip).

Transceiver 502 is operable to transmit RF communications to one or more access terminals via a forward-link (e.g., forward-link 122). Those RF communications form the one or more coverage areas of base station 106. Processor 500 may provide transceiver 502 with the communication signals (e.g., paging messages, text messages, voice call traffic) to be transmitted as RF communications.

Transceiver 502 is also operable to receive RF communications transmitted from an access terminal via a reverse-link (e.g., reverse-link 124). Transceiver 502 may provide processor 500 with communication signals recovered from the RF communications it receives from an access terminal. Those communication signals may include messages including complete text messages or messages including portions of a complete text message, a message identifier, and a message sequence identifier).

BS-to-BSC interface 504 is an interface that is operable to transmit communications to BSC 112 via a communication link between BS-to-BSC interface 504 and BSC 112. BS-to-BSC interface 504 is also operable to receive communications from BSC 112 via that communication link. The communication link may carry messages that base station 106 receives from an access terminal, such as messages including a complete text message and messages including a portion of a complete text message. Those messages may, in turn, be transmitted from BSC 112 to SMSC 116 for storage and subsequent transmission of those text messages to the desired endpoints.

Data storage device 506 may comprise a computer-readable storage medium readable by processor 500. The computer-readable storage medium may comprise volatile and/or non-volatile storage components, such as optical, magnetic, organic or other memory or disc storage, which can be integrated in whole or in part with processor 500. As illustrated in FIG. 5, data storage device 506 contains CRPI 516, text message data 510, access channel occupancy threshold (ACHOT) data 512, access channel occupancy (ACHO) data 514, and maximum number of TMCs data 518. Examples of CRPI 516 and data 510, 512, 514, and 518 are described below.

Text message data 510 may comprise text messages that base station 106 receives from an access terminal such as access terminal 102, and that are destined for a desired endpoint such as access terminal 104. The messages received from an access terminal may include a portion of a complete text message, a message identifier, and a message sequence identifier, or a complete text message. Text message data 510 may also comprise text messages that base station 106 receives from SMSC 116 for subsequent delivery to a desired endpoint such as access terminal 102.

ACHOT data 512 may comprise one or more thresholds pertaining to an occupancy level of one or more access channels associated with the paging channels of base station 106. ACHO data 514 may comprise data that indicates an occupancy level of each access channel that is associated with a paging channel of base station 106. Preferably, ACHOT data 512 and ACHO data 514 have the same units so that comparisons of those data may occur without converting one or both types of data 512 and 514.

CRPI 516 may comprise a variety of computer-readable program instructions. A person having ordinary skill in the art will understand that this description's reference to executing CRPI 516 may refer to executing all CRPI 516 or executing only a portion of CRPR 516. A portion of CRPI 516 that is executed is the portion implemented to carry out some particular function(s). The CRPI 516 described below are provided merely as examples and are not intended to be limiting since other CRPI may be implemented to carry out the described functions.

CRPI 516 may include program instructions executable by processor 500 to determine access channel occupancy (ACHO) data for storage as ACHO data 514. Those program instructions may cause processor 500 to determine, for each access channel that is associated with a paging channel of base station 106 and for a selected time period, a percentage that indicates the amount of time of the selected time period during which transceiver 502 receives communications via each access channel.

CRPI 516 may include program instructions executable by processor 500 to generate messages that include ACHOT data 512, ACHO data 514, and maximum number of TMCs data 518, and to cause transceiver 502 to transmit those messages via forward-link 122. Message 300, illustrated in FIG. 3, is an example of a message that includes ACHO data 514 for a single paging channel of base station 106 (i.e., paging channel number 5). Messages similar to message 300, but including ACHO data for another paging channel of base station 106, may be transmitted via the other paging channel so as to communicate other ACHO data contained within ACHO data 514 to access terminals monitoring that other paging channel.

A message or messages including ACHOT data 512 and/or maximum number of TMCs data 518 may comprise a message that is directed to particular access terminal during a registration sequence being performed by the access terminal and base station 106. Alternatively, a message or messages including ACHOT data 512 and/or maximum number of TMCs data 518 may comprise a message that is broadcast to all access terminals monitoring a paging channel of base station 106.

CRPI 516 may include program instructions executable by processor 500 to determine whether text messages received via transceiver 502 include a message number and sequence identifier that indicates that the text messages include a portion of TMCs of a complete text message but not all TMCs of that complete text message. If processor 500 determines that a text message includes all TMCs of a complete text message, processor 500 can execute CRPI 516 that cause BS-to-BSC interface 504 to transmit that text message to BSC 112 for transmission, in turn, to SMSC 116.

If processor 500 determines that a text message includes only a portion of the TMCs of a complete text message, processor 500 can execute CRPI 516 that cause processor 500 to determine that all portions of the TMCs of the complete text message have been received and then cause BS-to-BSC interface 504 to transmit each respective text message including a portion of the TMCs to BSC 112 for transmission, in turn, to SMSC 116. Those CRPI 516 may include program instructions that are executable by processor 500 to determine that an end-of-message indicator was included in one of the text messages including a portion of the TMCs and that each of the text messages including a portion of the TMCs included a respective sequence identifier of a sequence of messages including all portions of the TMCs.

IV. Example Operation

Figure 6:
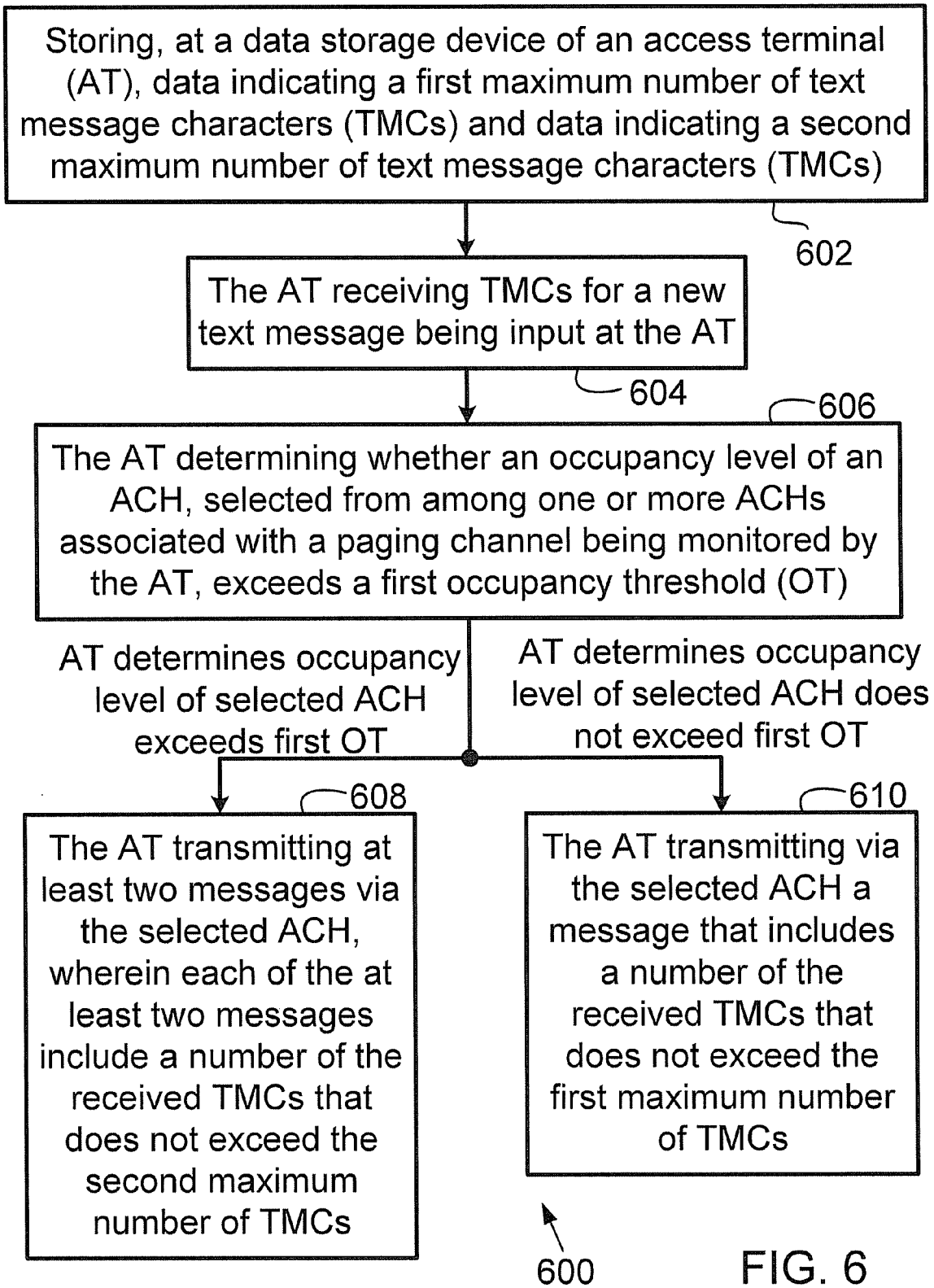
FIG. 6 is a flow chart depicting a set of functions that may be carried out in accordance with an example embodiment.

Next, FIG. 6 is a flow chart depicting a set of functions 600 that may be carried out in accordance with an example embodiment. FIG. 6 refers to an access terminal, and in the description of FIG. 6 below, that access terminal is referred to as access terminal 102. A person having ordinary skill in the art, however, will understand that the set of functions 600 may also be carried out via an access terminal other than access terminal 102.

Block 602 includes storing, at a data storage device of an access terminal, data indicating a first maximum number of TMCs and data indicating a second maximum number of TMCs. Data storage device 208 may store one or more of those two maximum numbers of TMCs as maximum number of TMCs data 220. The first maximum number of TMCs is greater than the second maximum number of TMCs and may be encoded as part of CRPI 212.

The first maximum number of TMCs can be the maximum number of TMCs that are able to be sent as a complete text message. In that regard, for example, the first maximum number of TMCs may be 160 TMCs. The second maximum number of TMCs can be the maximum number of TMCs that are to be sent via a message including a portion of TMCs of the complete text message. The second maximum number of TMCs may be selected to decrease the size of a text message that is sent over an access channel such that the likelihood of that message colliding with another message on the access channel is reduced. In that regard, for example, the second maximum number of TMCs may be 10, 20, 30 or some number of TMCs less than the first maximum number of TMCs.

Access terminal 102 may receive and then store the first and second maximum numbers of TMCs while access terminal 102 is being manufactured. The stored maximum numbers of TMCs may be default numbers that are fixed (i.e., not modified) for the service life of access terminal 102. Alternatively, one or more of the first and second maximum numbers of TMCs that get stored at data storage device 208 may be modified by processor 202 executing CRPI 212 that cause a maximum number of TMCs stored at data storage device 208 to be replaced (e.g., overwritten) with another maximum number of TMCs. The other maximum number of TMCs may be received from a base station to which access terminal 102 hands over while access terminal 102 is operating in an idle mode.

Next, block 604 includes the access terminal receiving TMCs for a new text message being input at the access terminal. The TMCs may be input via keyboard 408 or via some other means of user interface 206. The TMCs for the new text message may include the TMCs of text message 410.

Next, block 606 includes the access the access terminal determining whether an occupancy level of an access channel, selected from among one or more access channels associated with a paging channel being monitored by the access terminal, exceeds a first occupancy threshold. Monitoring the paging channel may include the access terminal detecting messages transmitted over that paging channel and detecting whether the transmitted message is broadcast to all access terminals monitoring the paging channel or is a message directed specifically to the access terminal.

The determination of block 606 may, for example, be made by processor 202 executing CRPI 212 to receive or retrieve the occupancy level of the access channel and the first occupancy threshold and to thereafter compare that occupancy level to that occupancy threshold. The first occupancy threshold may be stored as ACHOT data 218 and the occupancy level of the access channel may be stored as ACHO data 216 prior to making the determination of block 606.

In a first case, the access terminal 102 and/or processor 202 determines that the occupancy level of the selected access channel exceeds the occupancy threshold. In such a case, after and/or in response to making the determination at block 606, execution of the set of functions 600 may continue at block 608.

In a second case, the access terminal 102 and/or processor 202 determines that the occupancy level of the selected access channel does not exceed the first occupancy threshold. In such a case, after and/or in response to making the determination at block 606, execution of the set of functions 600 may continue at block 610.

In a third case, the access terminal 102 and/or processor 202 determines that the occupancy level of the selected access channel equals the first occupancy threshold. The third case is not represented in FIG. 6, but in such a case, after and/or in response to making the determination at block 606, execution of the set of functions 600 may continue at either block 608 or block 610.

Next, block 608 includes the access terminal transmitting at least two messages via the selected access channel, wherein each of the at least two messages includes a number of the received text message characters that does not exceed the second maximum number of text message characters. For example, if the first maximum number of TMCs is 10 and if the TMCs received by access terminal 102 at block 604 are—Hello world!—, then a first of the at least two messages include the 10 TMCs—Hello worl—, and a second of the at least two messages include the 2 TMCs d!—. The space between Hello and world is considered a TMC.

Table 4 illustrates data for the example text message—Hello world!—. As an example, the text message is assigned the message identifier 14. The TMCs of message 14 are illustrated in the left-most column of Table 4. Since message 14 includes 12 TMCs, as shown by counter 2, and since the maximum number of TMCs for messages being sent by the access terminal is 10, as shown by the Max. No. of TMCs column of Table 4, 2 separate messages are sent by transceiver 204 in order to transmit respective portions of message 14's TMCs. A first of those 2 messages is associated with a message sequence identifier 1, and a second of those 2 messages is associated with a message sequence identifier 2.

TABLE 4

| TMC of text message | Counter 1 | Counter 2 | Max. No. of TMCs | SEND key pressed after TMC entered | Transmit TMCs | Msg. ID | Message Sequence ID |
|---|---|---|---|---|---|---|---|
| H | 1 | 1 | 10 | No | No | 14 | 1 |
| e | 2 | 2 | 10 | No | No | 14 | 1 |
| l | 3 | 3 | 10 | No | No | 14 | 1 |
| l | 4 | 4 | 10 | No | No | 14 | 1 |
| o | 5 | 5 | 10 | No | No | 14 | 1 |
| ∅ | 6 | 6 | 10 | No | No | 14 | 1 |
| w | 7 | 7 | 10 | No | No | 14 | 1 |
| o | 8 | 8 | 10 | No | No | 14 | 1 |
| r | 9 | 9 | 10 | No | No | 14 | 1 |
| l | 10 | 10 | 10 | No | Yes | 14 | 1 |
| d | 1 | 11 | 10 | No | No | 14 | 2 |
| ! | 2 | 12 | 10 | Yes | Yes | 14 | 2 |

Next, block 610 includes the access terminal transmitting, via the selected access channel, a message that includes a number of received text message characters that does not exceed the first maximum number of text message characters.

For example, if the first maximum number of TMCs is 10, the second maximum number of TMCs is 160, and if the TMCs received by access terminal 102 at block 604 are—Hello world!—, then the TMCs included in the message transmitted at block 610 are—Hello world!—.

Figure 7:
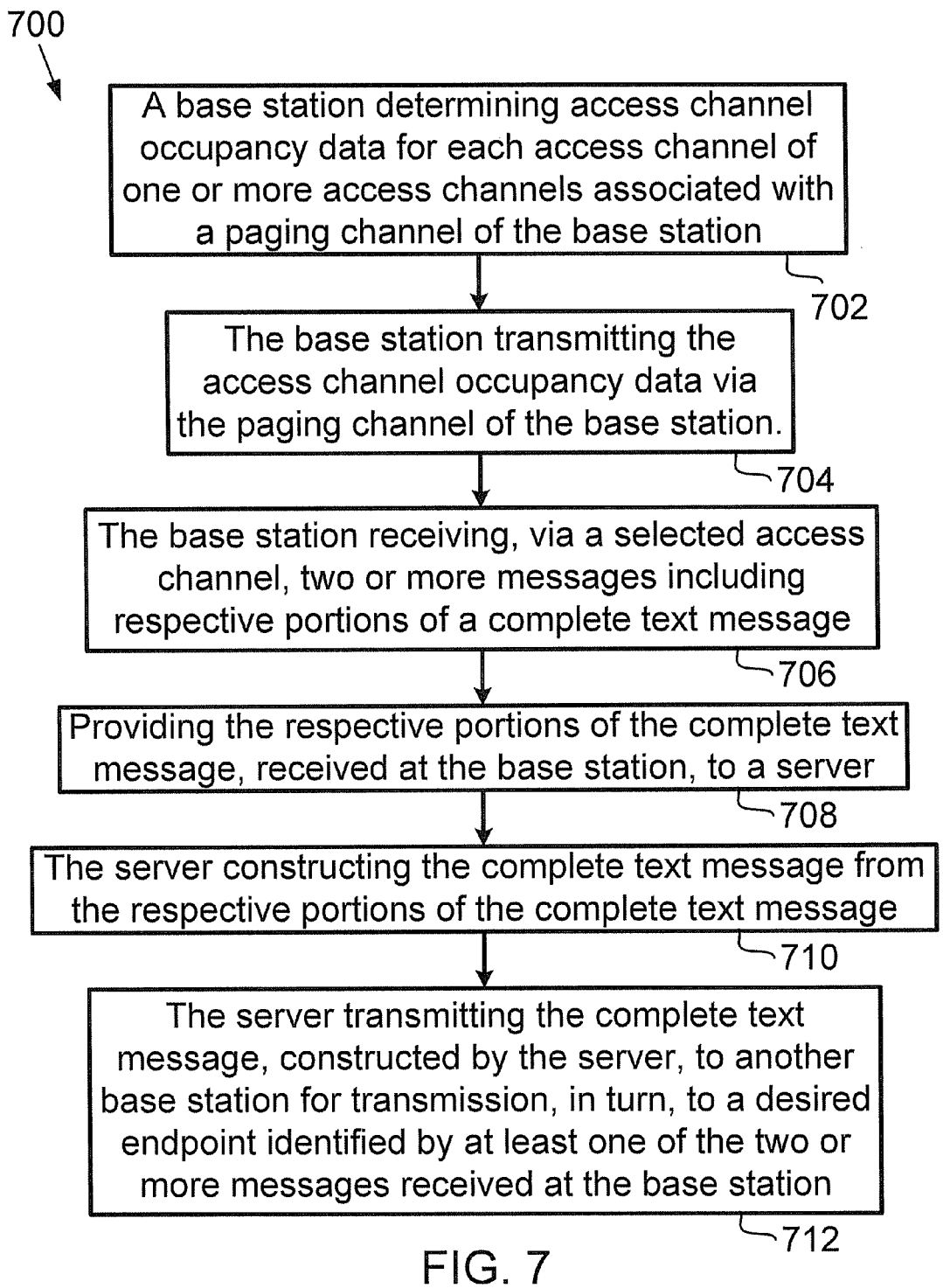
FIG. 7 is a flow chart depicting another set of functions that may be carried out in accordance with an example embodiment.

Next, FIG. 7 is a flow chart depicting a set of functions 700 that may be carried out in accordance with an example embodiment. FIG. 7 refers to a base station and another base station, and in the description of FIG. 7 below, the base station is referred to as base station 106 and the other base station is referred to as base station 110. A person having ordinary skill in the art, however, will understand that the set of functions 700 may also be carried out via base stations other than base stations 106 and 110, and that base station 110 can function as the first base station referred to in FIG. 7 and base station 106 can function as the other base station.

Block 702 includes a base station (e.g., base station 106) determining access channel occupancy data for each access channel of one or more access channels associated with a paging channel of the base station. Base station 106 may execute CRPI 516 to determine ACHO data for each of those access channels and store that ACHO data as ACHO data 514. Table 1 illustrates example ACHO data for each access channel associated with paging channel number 5. Base station 106 may repeatedly determine ACHO data and repeatedly store the most-recently determined ACHO data as ACHO data 514.

As an example, execution of CRPI 516 may cause processor 500 to determine, for each access channel of the one or more access channels, an amount of time within a given time period during which base station 106 (in particular, transceiver 502) is receiving data via the access channel from access terminals that are monitoring the paging channel associated with that access channel. Thereafter, execution of CRPI 516 may cause processor 500 to divide the given time period by the amount of time, for each access channel, that base station 106 is receiving data via that access channel so as to determine a respective quotient and to multiply each respective quotient by 100. In that regard, the determined ACHO data is a percentage.

Next, block 704 includes the base station (e.g., base station 106) transmitting the access channel occupancy data via the paging channel of the base station. To carry out the transmitting function of block 704, processor 500 may execute CRPI 516 to generate a message, such as message 300, and to cause transceiver 502 to transmit message 300. In that regard, transceiver 502 transmits message 300 via the paging channel associated with Walsh code number 5, as identified by paging channel identifier 304. Transceiver 502 may transmit messages similar to message 300 via another paging channel, but those messages include ACHO data that is associated with access channels that are associated with the other paging channel.

Next, block 706 includes the base station (e.g., base station 106) receiving, via a selected access channel, two or more messages including respective portions of a complete text message. Each of the two or more messages may include a common message identifier (e.g., message identifier 14, as shown in Table 4). Each of the two or more messages may include a unique sequence identifier (e.g., sequence identifiers 1 and 2, as shown in Table 4). Upon receiving each of the two or more messages, base station 106 may store the received messages as text message data 510. Furthermore, upon receiving each of the two or more messages, processor 500 may execute CRPI 516 so as to determine whether one of the received messages includes the last TMCs entered for the text message. Processor 500 may determine that a message includes the last entered TMCs by determining that the message includes an end-of-message indicator.

Next, block 708 includes providing the respective portions of the complete text message, received at the base station (e.g., base station 106), to a server (e.g., SMSC 116). Providing each respective portion of the complete text message to SMSC 116 may comprise providing SMSC 116 with the message, received at the base station, which includes that respective portion. Providing each message including a portion of the text message to SMSC 116 may include base station 106 transmitting each message to BSC 112, BSC 112 transmitting each message to MSC 114, and MSC 114 transmitting each message to SMSC 116.

In one respect, processor 500 may execute CRPI 516 to cause BS-to-BSC interface 504 to transmit each received message of the two or more messages to BSC 112, after that message is received, without waiting for processor 500 to determine that base station 106 has received messages comprising all portions of the complete text message. BSC 112, in turn, transmits the messages it receives from base station 106 to MSC 114 for transmission, in turn, to SMSC 116.

In another respect, prior to providing the respective portions of the complete text message to SMSC 116, processor 500 may execute CRPI 516 to determine that messages comprising all portions of the complete text message have been received, and thereafter cause BS-to-BSC interface 504 to transmit each received message of the two or more messages to BSC 112 for subsequent transmission of those messages to MSC 114 and then to SMSC 116.

Next, block 710 includes the server (e.g., SMSC 116) constructing the complete text message from the respective portions of the complete text message. The processor of SMSC 116 may execute CRPI stored within the data storage device of SMSC 116 to cause that processor to concatenate TMCs from each of the respective portions of the complete text message so as to construct the complete text message.

In concatenating the respective portions, the SMSC processor may determine the messages including the respective portions by identifying a common message identifier in each of those messages (e.g., message identifier 14, as shown in Table 4). Thereafter, the SMSC processor may determine the sequence of each respective portion of the complete text message based on a unique sequence identifier contained within each message that includes a portion of the complete text message, and then concatenate the TMCs of each of those messages in accordance with the determined sequence, starting with the earliest entered TMCs and finishing with the latest entered TMCs.

SMSC 116 may store the concatenated text message (i.e., the message constructed by SMSC 116) in the SMSC data storage device until that message has been delivered to each desired endpoint associated with that message. The message constructed by SMSC 116 may include an identifier of the desired endpoint associated with the constructed message for subsequent routing of the message to the desired endpoint.

Next block 712 includes the server (e.g., SMSC 116) transmitting the complete text message, constructed by the server, to another base station (e.g., base station 110) for transmission, in turn, to a desired endpoint identified by at least one of the two or more messages received at the base station (e.g., base station 106).

As an example, the desired endpoint may be access terminal 104. SMSC 116 may query HLR 118 and/or VLR 134 to determine whether access terminal 104 is active and, if access terminal 104 is active, to which base station access terminal 104 is registered. If SMSC 116 determines that access terminal 104 is not active, SMSC 116 continues to store the text message constructed by SMSC 116. On the other hand, if SMSC 116 determines that access terminal 104 is active, SMSC 116 may transmit the text message constructed by SMSC 116 to MSC 114 for transmission, in turn, to BSC 112 and from BSC 112 to base station 110 for subsequent transmission of the text message to access terminal 104 via forward-link 128.

In an alternative arrangement, the desired endpoint may be a node on IP network 136, such as a desktop computer. In accordance with this alternative arrangement, instead of transmitting the complete text message to another base station, SMSC 116 may transmit the complete text message to IP network 136 via MSC 114 and perhaps one or more other devices, such as a gateway device between MSC 114 and IP network 136, such that IP network 136 can carry the complete text message to the node on the IP network 136.

In yet another alternative arrangement, the desired endpoint may be another access terminal operating in a coverage area formed by base station 106. In accordance with that arrangement, SMSC 116 may transmit the text message constructed by SMSC 116 to MSC 114 for transmission, in turn, to BSC 112 and from BSC 112 to base station 106 for subsequent transmission of the text message to the other access terminal via forward-link 122.

V. Conclusion

Example embodiments of the present invention have been described above. Those skilled in the art will understand that changes and modifications may be made to the described embodiments without departing from the true scope and spirit of the present invention, which is defined by the claims.

We claim:

1. A method comprising:
   storing, at a data storage device of an access terminal, data indicating a first maximum number of text message characters and data indicating a second maximum number of text message characters, wherein the first maximum number of text message characters is greater than the second maximum number of text message characters;
   receiving, using the access terminal, text message characters for a new text message being input at the access terminal;
   determining, using the access terminal, whether an occupancy level of an access channel, selected from among one or more access channels associated with a paging channel being monitored by the access terminal, exceeds a first occupancy threshold or does not exceed the first occupancy threshold,
   in response to determining the occupancy level of the selected access channel exceeds the first occupancy threshold, transmitting, using the access terminal and via the selected access channel, at least two messages that include a respective portion of the received text message characters that does not exceed the second maximum number of text message characters; and
   in response to determining the occupancy level of the selected access channel does not exceed the first occupancy threshold, transmitting, using the access terminal and via the selected access channel, a message that includes a number of the received text message characters that does not exceed the first maximum number of text message characters.

2. The method of claim 1, further comprising:
   the access terminal receiving access channel occupancy data for each of the one or more access channels associated with the monitored paging channel; and
   the access terminal determining, from the access channel occupancy data, an occupancy level of the selected access channel,
   wherein determining whether an occupancy level of the selected access channel exceeds a first occupancy threshold or does not exceed the first occupancy threshold includes comparing the occupancy level of the selected access channel to the first occupancy threshold.

3. The method of claim 1, wherein each message of the at least two messages comprises a common message identifier and a unique sequence identifier for constructing the new text message at a device that receives the at least two messages.

4. The method of claim 1, further comprising:
   storing, at the data storage device of the access terminal, data indicating a third maximum number of text message characters, wherein the second maximum number of text message characters is greater than the third maximum number of text message characters; and
   the access terminal determining that the occupancy level of the selected access channel exceeds a second occupancy threshold,
   wherein determining whether the occupancy level of the access channel exceeds the first occupancy threshold or does not exceed the first occupancy threshold includes determining the occupancy level of the selected access channel exceeds the first occupancy threshold, and
   wherein each message of the at least two messages includes a number of text message characters that does not exceed the third maximum number of text message characters.

5. The method of claim 1, further comprising:
   the access terminal receiving an end-of-message indicator, wherein if the access terminal determines that the occupancy level of the selected access channel exceeds the first occupancy threshold, then the access terminal includes the end-of-message indicator in a final message of the at least two messages transmitted by the access terminal.

6. The method of claim 5, wherein the end-of-message indicator is generated in response to a send button on the access terminal being pushed.

7. The method of claim 1,
   wherein the first maximum number of text message characters indicates a maximum number of text message characters that the access terminal can transmit via a message including a complete text message, and
   wherein the second maximum number of text message characters indicates a maximum number of text message characters that the access terminal can transmit via a message including a portion of the text message characters of the complete text message.

8. An access terminal comprising:
   a user interface to receive text message characters for a new text message;
   a transceiver to receive signals via a paging channel being monitored by the access terminal;
   a non-transitory data storage device storing computer-readable program instructions, an occupancy threshold, data indicating a first maximum number of text message characters, and data indicating a second maximum number of text message characters, wherein the first maximum number of text message characters is greater than the second maximum number of text message characters; and
   a processor to execute the computer-readable program instructions,
   wherein the program instructions are executable by the processor to determine whether an occupancy level of an access channel, selected from one or more access channels associated with the monitored paging channel, exceeds the occupancy threshold or does not exceed the first occupancy threshold, wherein the program instructions are executable by the processor, in response to the processor determining that the occupancy level of the selected access channel exceeds the occupancy threshold, to cause the transceiver to transmit, via the selected access channel, at least two messages that include a respective portion of the received text message characters that does not exceed the second maximum number of text message characters; and wherein the program instructions are executable by the processor, in response to the processor determining that the occupancy level of the selected access channel does not exceed the occupancy threshold, to cause the transceiver to transmit, via the selected access channel, a message that includes a number of the received text message characters that does not exceed the first maximum number of text message characters.

9. The access terminal of claim 8, wherein the computer-readable program instructions are executable by the processor to include a common message identifier and a unique sequence identifier for constructing the text message at a device that receives the at least two messages.

10. The access terminal of claim 8,
wherein the data storage device stores access channel occupancy data for the selected access channel,
wherein the access channel occupancy data indicates an occupancy level of the selected access channel, and
wherein execution of the program instructions to determine whether the occupancy level of the selected access channel exceeds the occupancy threshold or does not exceed the first occupancy threshold causes the processor to compare the access channel occupancy data for the selected access channel to the occupancy threshold.

11. The access terminal of claim 8, wherein the signals received by the transceiver include access channel occupancy data that indicates the occupancy level of the access channel.

12. A non-transitory computer-readable medium storing computer-readable program instructions executable by a processor to (i) refer to stored data indicating a first maximum number of text message characters and stored data indicating a second maximum number of text message characters, wherein the first maximum number of text message characters is greater than the second maximum number of text message characters, (ii) receive text message characters for a new text message, (iii) determine whether an occupancy level of an access channel, selected from among one or more access channels associated with a monitored paging channel, exceeds a first occupancy threshold or does not exceed the first occupancy threshold, and (iv) in response to determining the occupancy level of the selected access channel exceeds the first occupancy threshold, transmitting at least two messages via the selected access channel, wherein each message of the at least two messages includes a respective portion of the received text message characters that does not exceed the second maximum number of text message characters, and in response to determining the occupancy level of the selected access channel does not exceed the first occupancy threshold, transmitting, via the selected access channel, a message that includes a number of the received text message characters that does not exceed the first maximum number of text message characters.

13. The non-transitory computer-readable medium of claim 12,
wherein the computer-readable program instructions are executable by the processor to receive access channel occupancy data for each of the one or more access channels associated with the monitored paging channel, determine, from the access channel occupancy data, an occupancy level of the selected access channel, and compare the occupancy level of the selected access channel to the first occupancy threshold.

14. The non-transitory computer-readable medium of claim 12, wherein each message of the at least two messages comprises a common message identifier and a unique sequence identifier for constructing the new text message at a device that receives the at least two messages.

15. The non-transitory computer-readable medium of claim 12,
wherein the computer-readable program instructions are executable by the processor to refer to stored data indicating a third maximum number of text message characters, and determine that the occupancy level of the selected access channel exceeds a second occupancy threshold,
wherein the second maximum number of text message characters is greater than the third maximum number of text message characters, and
wherein each message of the at least two messages includes a number of text message characters that does not exceed the third maximum number of text message characters.

16. The non-transitory computer-readable medium of claim 12,
wherein the computer-readable program instructions are executable by the processor to receive an end-of-message indicator, and include an end-of-message-indicator in a final message of the at least two messages if the processor determines that the occupancy level of the selected access channel exceeds the first occupancy threshold.

17. The non-transitory computer-readable medium of claim 16, wherein the end-of-message indicator is generated by an access terminal in response to a send button being pushed.

18. The non-transitory computer-readable medium of claim 12,
wherein the first maximum number of text message characters indicates a maximum number of text message characters an access terminal can transmit via a message including a complete text message, and
wherein the second maximum number of text message characters indicates a maximum number of text message characters the access terminal can transmit via a message including a portion of the text message characters of the complete text message.

* * * * *